(12) United States Patent
Naveh et al.

(10) Patent No.: US 11,087,178 B2
(45) Date of Patent: Aug. 10, 2021

(54) AUTOMATED VISUAL SUGGESTION, GENERATION, AND ASSESSMENT USING COMPUTER VISION DETECTION

(71) Applicant: Facebook, Inc., Menlo Park, CA (US)

(72) Inventors: Barak R. Naveh, Palo Alto, CA (US); James Reyes, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 228 days.

(21) Appl. No.: 16/382,431

(22) Filed: Apr. 12, 2019

(65) Prior Publication Data

US 2020/0327375 A1    Oct. 15, 2020

(51) Int. Cl.
*G06K 9/00*      (2006.01)
*G06K 9/62*      (2006.01)
(Continued)

(52) U.S. Cl.
CPC ....... *G06K 9/6262* (2013.01); *G06F 16/5866* (2019.01); *G06K 9/00624* (2013.01);
(Continued)

(58) Field of Classification Search
CPC .......... G06T 7/0012; G06T 7/0083; G06T 2207/30004; G06T 7/0081; G06T 2207/10116; G06T 5/40; G06T 2207/30068; G06T 7/0085; G06T 7/60; G06T 7/12; G06T 7/11; G06T 7/174; G06T 1/00; G06T 7/00; G06T 7/0016; G06T 7/13; G06T 7/70; G06F 19/321; G06F 16/5866; A61B 5/02007; A61B 5/7264; A61B 5/742; G06K 9/4604; G06K 9/52; G06K 9/6267; G06K 9/66; G06K 9/6262; G06K 9/00624; G06K 9/623; G06K 9/6253; G01N 33/4833; G01N 33/48; G01N 33/5091; G06N 20/00; G06Q 30/02; G06Q 30/0269; G06Q 30/0277

See application file for complete search history.

(56) References Cited

U.S. PATENT DOCUMENTS

2006/0026067 A1* 2/2006 Nicholas ................ G06Q 30/00
                                                          705/14.58
2018/0040029 A1   2/2018 Zeng et al.

OTHER PUBLICATIONS

Anonymous, "Object detection", Wikipedia, Feb. 8, 2018, 3 pages.
(Continued)

*Primary Examiner* — Duy M Dang
(74) *Attorney, Agent, or Firm* — Mannava & Kang, P.C.; George Y. Wang

(57) ABSTRACT

An online system may identify content with which a user has an interest. For example, the online system may determine that a user has an interest in the content based on interaction information indicating that the user interacted with the content. In a particular example, the online system may identify image concepts included in the content based on computer vision techniques that recognize the image concepts. The online system may model probabilities that image concepts will appeal to users. Based on the modeled probabilities, the online system may automatically recommend image concepts for inclusion in candidate images, automatically generate candidate images, or assess candidate images to determine a probability of user interaction with the assessed candidate images.

20 Claims, 11 Drawing Sheets

(51) Int. Cl.
*G06T 7/70* (2017.01)
*G06N 20/00* (2019.01)
*G06F 16/58* (2019.01)

(52) U.S. Cl.
CPC ........... *G06K 9/623* (2013.01); *G06K 9/6253* (2013.01); *G06N 20/00* (2019.01); *G06T 7/70* (2017.01)

(56) References Cited

OTHER PUBLICATIONS

Anonymous, "Generative adversarial network", Wikipedia, Mar. 30, 2019, 5 pages.
International Search Report and Written Opinion dated Jun. 4, 2020, PCT Patent Application No. PCT/US2020/025903, filed Mar. 31, 2020, European Patent Office, 15 pages.

* cited by examiner

AUTOMATED VISUAL SUGGESTION, GENERATION, AND ASSESSMENT USING COMPUTER VISION DETECTION

TECHNICAL FIELD

This patent application relates generally to artificial intelligence (AI) based image analysis and generation based on computer vision, and more specifically, to systems and methods for automated visual analysis using computer vision detection techniques.

BACKGROUND

With recent advances in mobile technology and social media, people are interacting with digital content on their mobile user devices like never before. Although vast quantities of digital content are being thrust upon users, much of that digital content is ignored because people have unique preferences and are attracted to different things. This poses unique challenges for content providers and creators, such as advertisers.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
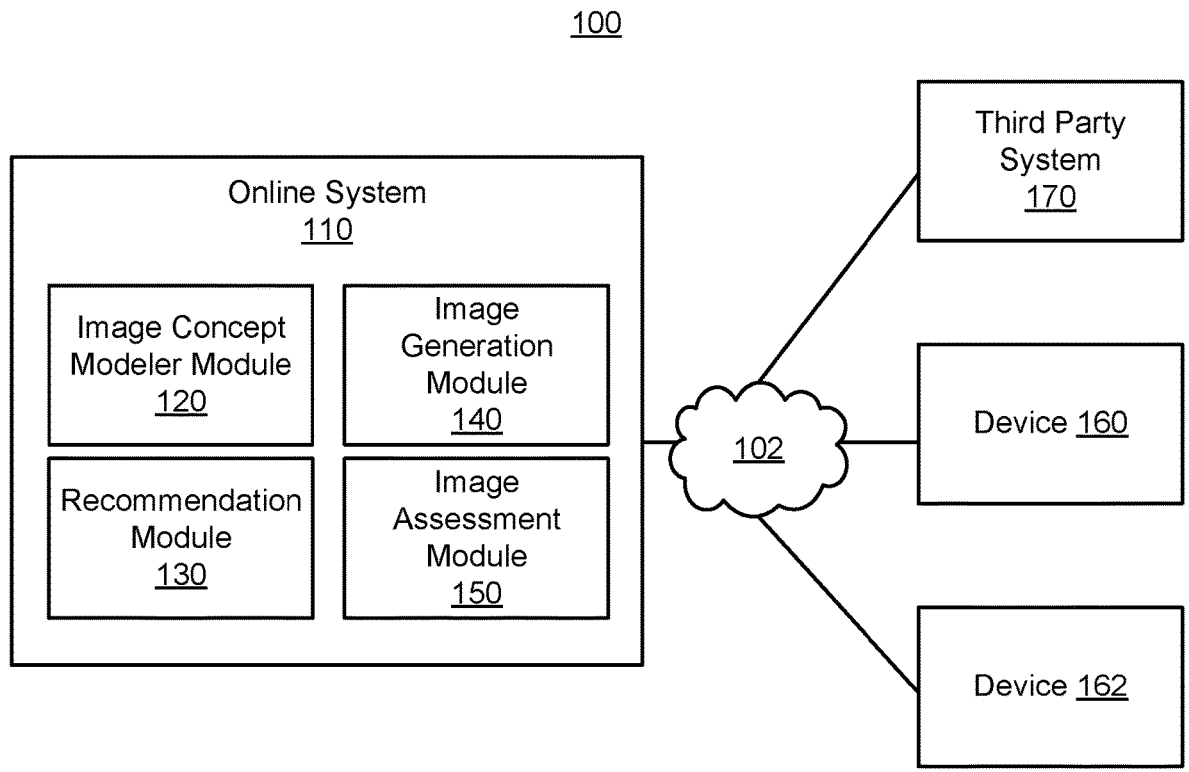
FIG. 1 illustrates a block diagram of a computer environment of an online system of automated visual suggestions, generation, and assessment based on object detection and analysis of images, according to an example.

For simplicity and illustrative purposes, the present disclosure is described by referring mainly to examples thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Conventional targeted advertisements have generally relied on textual descriptions to determine a user's interest. However, as content is increasing in volume and becoming more and more multi-modal, a more robust and comprehensive approach may be required to stimulate or identify interest in users to elicit increased user interaction with relevant content. Although traditional systems are able to monitor some level of user interaction with content, these systems may fail to understand why users interact with the content the way they do. Gaining such an understanding may help guide content providers and creators to better craft content to maximize user interactivity with targeted content.

A technical problem with current technologies involves creating and training a system to perceive visuals in a human-like manner in order to understand concepts that are relevant to human interest in certain visuals but not others. However, conventional systems fail to fully meet these and other challenges. As a result, a more robust approach and dynamic solution may be needed to overcome these and other shortcomings associated with traditional techniques.

Systems and methods for automated content concept recommendation, generation, and assessment based on computer vision and AI based techniques is disclosed herein. As used herein throughout, the term "content concept" may be used to describe a physical thing (such as an object) or sensory feeling (such as an emotion) conveyed by content. Such content may include, without limitation, images, videos, photographs, animations, advertisements, documents, webpages, and/or other content. A content concept may include an object (such as a road sign or jewelry), a mood (such as perceived through facial expression recognition), a color, a scene (such as "winter storm"), and/or a sentiment (such as a feeling or response). Other examples of content concepts may include pixel art, sunrise, beach, sports, nudity, black & white photograph, pastel colors, engine, meme/slogan, and/or other element that may be conveyed by content. As described in more detail herein, a portion of content may convey a cat. This content may therefore include a content concept "cat." Although examples described herein are generally directed to "image concepts," which are content concepts that may be visually conveyed, it should be appreciated that the terms "image concept," as used herein, may be used interchangeably with "content concept" to describe any variety of concepts being conveyed by content, which will be apparent from the description and examples below.

An online system may generate machine learning models that identify image concepts that are predicted to appeal to users. Such machine learning models may be trained based on interaction information that tracks user interactions with images. Identifying points of user interaction with images, for example, may be indicative that users are interested in such images. The online system may analyze the images using computer vision techniques to detect image concepts in the images. The machine learning models may represent probabilities that an image concept will appeal to a user by virtue of the image concept appearing in an image that was interacted with by the user and/or other users.

To illustrate, the online system may access interaction information that indicates users have interacted with images that include an image concept "cat" (that is, the images include similar type of object (e.g., a cat)). The online system may train machine learning models based on this interaction information. Such training may involve making the connection that some or all the images interacted with by the users include a cat. Because the images may also include other image concepts, the online system may train the machine learning models to identify which ones of the image concepts are most strongly correlated with user interactions with images. Put another way, the online system may train the machine learning models to generate a probability that an image concept caused user interest in images with which users interacted, which will be described in more detail herein.

To further illustrate, the machine learning models may be trained by examining relative prevalence of image concepts that appear in images interacted with by the users. For example, assume that the users interacted with ten images and that eight of these images include cats. Two of the images may also include dogs. Each image may also include other image concepts as well. The online system may determine that because cats predominate (or at least appear more frequently than another image concept) in the images interacted with by the users, the online system may deduce that the image concept "cat" is the likely reason that the users interacted with the images, more so than the image concept "dog." As will be described herein, the online system may determine a probability that a given image concept (such as "cat") may cause a user's interest in that image based on the number of images interacted with by users that include the given image concept.

In some examples, the online system may detect image concepts included in the images based on computer vision techniques. A given image may include multiple image concepts, some or all of which may not be a reason that the user has an interest in the given image. As such, the online system may model probabilities that an image concept contributed to the interest in the given image. For example, an online system may generate a machine learning model that generates and outputs a probability that an image concept will appeal to users based on user interactions with images that include the image concept.

To illustrate, the online system may observe that a user interacted with various images. Each of the images may include respective sets of image concepts, such as an image concept "cat," "dog," and/or other image concepts. Some of the image concepts may have contributed to the user interaction with the images while others may not. The online system may generate a machine learning model based on image concepts that commonly appear in images interacted with by the user, correlating such image concepts with user interaction of images that contain the image concepts.

By training the machine learning model based on data from multiple users and multiple interactions with various images, the online system may generate a machine learning model based on multiple correlations between image concepts and images that were interacted with. For example, the machine learning model may predict that the image concept contributed to user interest in images that contain the image concept. The online system may generate the machine learning model based further on correlations between user attributes and image concepts, as will be described in more detail herein.

To further illustrate, the online system may determine that a certain demographic of users, such as 19-year-old users (based on a user attribute indicating a user's age), have interacted with images that includes cats and dogs, among other image concepts. The online system may correlate the image concepts "cat" and "dog" with the 19-year-old user demographic because this demographic has interacted with images including these image concepts. The online system may correlate other image concepts with the 19-year-old user demographic as well. Over time, the online system may track the number of times that the 19-year-old user demographic interacted with images that include image concepts "cat" and "dog." For example, as an increasing number of interactions with images that includes cats are observed, the online system may strengthen the correlation between the image concept "cat" and the 19-year-old user demographic.

As such, the online system may determine a number of times that 19-year-old user demographic interacted with images having cats such that a higher number may indicate a higher probability that the 19-year-old user demographic is drawn to the image concept "cat." The online system may generate a machine learning model based on this correlation between the image concept "cat" and the 19-year-old user demographic. The machine learning model may be built based on other correlations, such as a correlation between the image concept "dog" and the 19-year-old user demographic. Thus, the machine learning model may generate and output probabilities (which may increase as more image concepts appear in images interacted with) that certain image concepts will appeal to certain users with particular attributes.

The online system may further use the machine learning model in various ways. For example, the online system may use the machine learning model to recommend visuals (image concepts) that should be included in or otherwise conveyed by images that are to be presented to users. To illustrate, a requester may provide an audience definition that specifies attributes of users that are to receive the images. The online system may apply the machine learning model, which is trained based on user interactions with images having image concepts, to determine and identify image concepts that are predicted to appeal to the users based on the attributes of the users. The online system may then recommend that the image concepts be included in the images.

Alternatively, or additionally, the online system may use the machine learning model to automatically generate images to be presented to users. For example, the online system may use AI techniques to automatically generate images based on image concepts predicted to appeal to users. Such AI techniques may include a Generative Adversarial Network (GAN) in which a generator generates the images and a discriminator determines whether the generated images will be of interest to the user based on the machine learning model. Output of the discriminator may be input to the generator to train the generator to generate images that will be increasingly likely to be interacted with by users. Other various techniques may also be provided.

In some examples, the online system may use the machine learning model to assess whether candidate images uploaded to the online system will be interacted with by users. For example, the online system may detect image concepts from a candidate image and determine whether a given audience having certain attributes will interact with the candidate image based on the detected image concepts.

FIG. 1 illustrates a block diagram of a computer environment 100 of an online system 110 for automated visual suggestions, generation, and assessment based on object detection and analysis of images, according to an example. The computer environment 100 may include an online system 110, devices 160, 162, and a third party system 170. The online system 110 may include a social networking system through which social network users, through respective devices 160, 162 consume content such as social media posts, games, or advertisements that includes images. The online system 110 may further have access to images from third party systems 170, such as through partnerships and affiliations.

The online system 110 may identify content with which a user has an interest. For example, the online system 110 may determine that a user has an interest in the content based on interaction information indicating that the user interacted with the content. Such user interactions may include, without limitation, uploading an image to the online system 110, selecting (such as "clicking on") the content, focusing on the content (such as when scrolling through and pausing for a predefined time period on the content), creating the content (such as taking a photograph), and/or other user interactions including those stored in an action log 920 described with respect to FIG. 9.

The online system 110 may identify image concepts included in the content based on computer vision techniques that recognize the image concepts. For example, the online system 110 may analyze the content and recognize image concepts such as objects, colors, moods, and/or other image concepts based on object detection techniques. As will be discussed further with respect to the concept detection module 940 of FIG. 9, the object detection techniques may include, without limitation, Detectron, Retinanet, Single shot detector (SSD) such as a single shot multi-box detector, You Only Look Once (YOLO), and/or other techniques for object detection. Each object detection technique may be used to generate machine learning models trained from or more image training datasets including, without limitation, the MS-COCO, ImageNet, Open Images Dataset, VisualQA, CIFAR-10, and/or other training datasets used to train machine learning models to detect objects in images.

Each image concept may (or may not) be at least a partial reason that the user has an interest in the content. Put another way, certain image concepts may appeal to a user, while other image concepts may not. As such, the online system 110 may model probabilities that image concepts will appeal to users.

For example, the image concept modeler module 120 may generate a machine learning model that may predict image concepts that will likely appeal to users based on user interactions with images from which image concepts are identified. The machine learning model may be used in various ways. The recommendation module 130 may use the machine learning model to generate recommendations of image concepts that should be included or otherwise conveyed by images that are to be presented to users. The image generation module 140 may use the machine learning model to automatically generate images to be presented to users. The image assessment module 150 may use the machine learning model to assess whether candidate images uploaded to the online system 110 will be interacted with by users.

Figure 2:
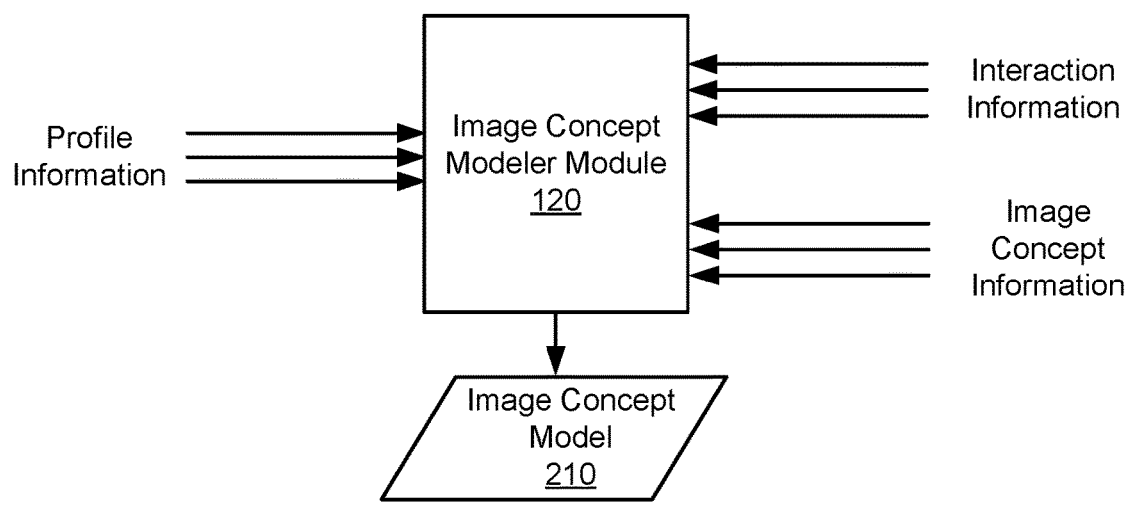
FIG. 2 illustrates a block diagram of an image concept modeler module, according to an example.

FIG. 2 illustrates a block diagram of the image concept modeler module 120, according to an example. The image concept modeler module 120 may obtain interaction information, which may identify images that were interacted with by users and the users that interacted with the images. As will be described with respect to FIG. 9, the online system 110 may generate a log of interactions made by users with content such as images within and/or outside the online system 110. The image concept modeler module 120 may associate the interaction information with image concepts identified from the images, which may be stored as image concept information. The image concept information may include a listing of image concepts detected in each image. Thus, the image concept information may include an identification of an image accessible by the online system 110 and the image concepts detected from the image. As such, based on the interaction information and the image concept information, the image concept modeler module 120 may identify image concepts from images that were interacted with by users. The image concept modeler module 120 may associate the interaction information and the image concept information with profile information of one or more users. The profile information may indicate characteristics of a user. Any personally-identifiable information in the profile information may be anonymized to protect the privacy of the user. Based on the inputs, the image concept modeler module 120 may associate user characteristics with image concepts found in images that were interacted with by users.

The image concept modeler module 120 may train an image concept model 210 based on the image concepts, interaction information that indicates user interactions with images that include the image concepts, and user characteristics of users that interacted with images from which the image concepts were identified. As such, the image concept model 210 may include a machine learning model trained from observed user interactions with images and concepts detected in those images. The image concept modeler module 120 may train the image concept model 210 iteratively over time, as interactions with images are observed both on and off the online system 110. In some examples, the image concept modeler module 120 may use negative feedback to train the image concept model 210. For example, non-interaction with images may be used to identify image concepts that may not appeal to users.

To illustrate, the image concept modeler module 120 may observe that a user interacted with various images based on the user interaction information. Each of the images may include respective sets of image concepts, as defined in the image concept information. Some of the image concepts may have contributed to the user interaction with the images while others may not. The image concept modeler module 120 may generate/train a machine learning model based on image concepts that commonly appear in images interacted with by the user, correlating such image concepts with user interaction of images that contain the image concepts. In other words, the image concept modeler module 120 may train machine learning models by correlating images that were interacted with by users as an indication that the users are interested in the images with image concepts contained in the images as an indication for why the users interacted with the images. It should be noted that information learned from a first user may be applied to other users that share one or more attributes with the first user. For instance, machine learning predictions of image concepts that appeal to a particular 19-year-old user may be applied to other 19-year-old users.

Figure 3:
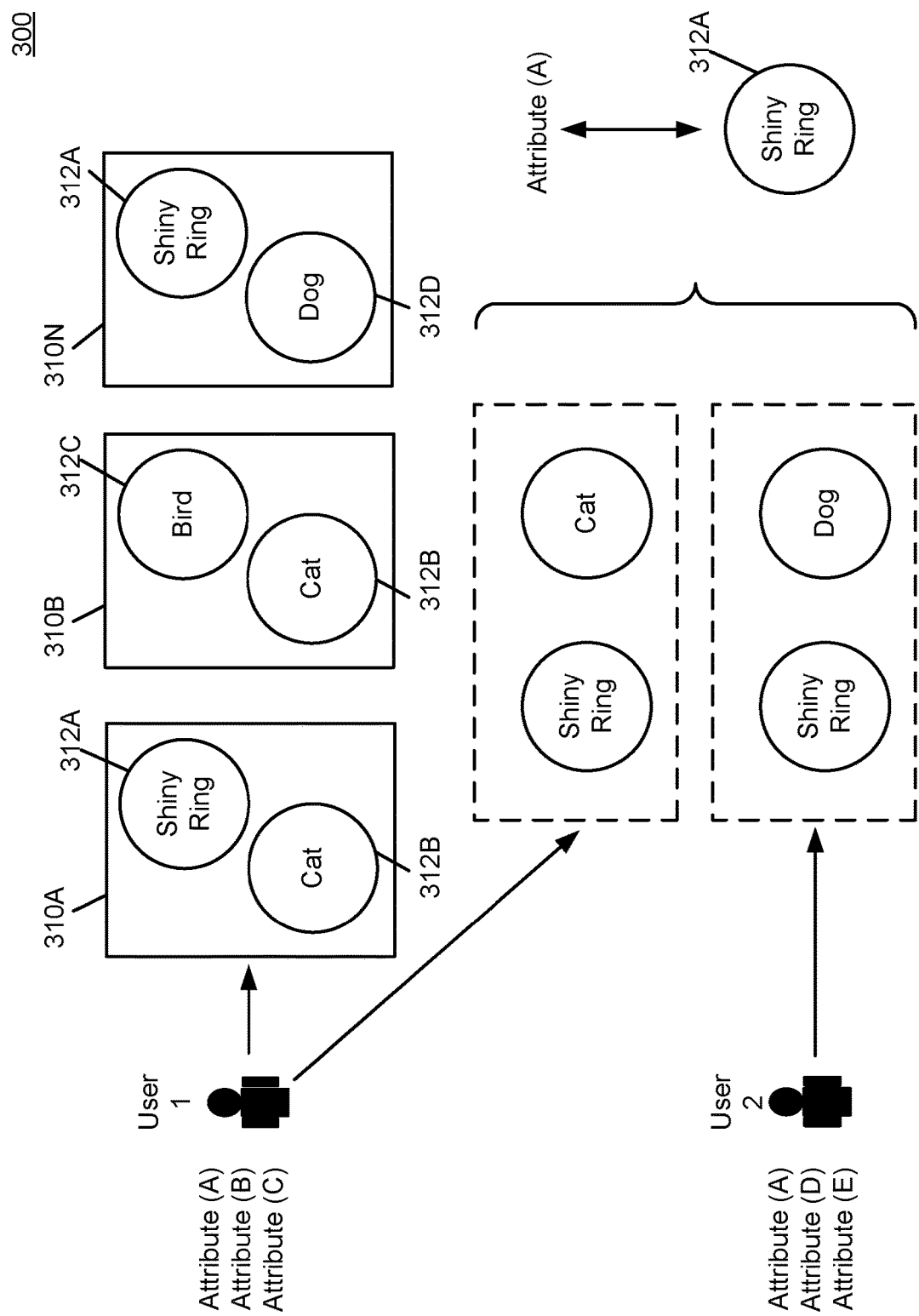
FIG. 3 illustrates a schematic diagram illustrating an example of correlating user attributes with image concepts, according to an example.

FIG. 3 illustrates a schematic diagram illustrating an example of correlating user attributes with image concepts 300, according to an example. In some examples, the image concept modeler module 120 may correlate image concepts 312 (illustrated as image concepts 312A-D) identified from images 310 (illustrated as images 310A-N) interacted with by a first user (User 1). User 1 may be associated with attributes (A-C). The image concept modeler module 120 may identify image concepts 312 (illustrated as image concept "shiny ring" 312A, image concept "cat" 312B, image concept "bird" 312C and image concept "dog" 312D) from the images 310. The image concept modeler module 120 may identify the most prevalent image concepts (based on deviation from a mean or predefined threshold). For example, the image concept modeler module 120 may determine that image concepts 312A and 312B are most prevalent.

In the illustrated example, concept 312A may correspond to an image concept "shiny ring" and concept 312B may correspond to an image concept "cat". These two image concepts may be the most prevalent image concepts among all image concepts observed in images 310 interacted with by the first user. Put another way, cats and shiny rings may appear most often in the images 310 interacted with by the first user compared to other image concepts. The most prevalent image concept may be defined as a top N selection of image concepts that appear in the images 310, where N is an integer that may be predefined. As such, the image concept modeler module 120 may correlate the first user with the image concepts 312A and 312B (e.g., in response to determining that the first user interacted with the image 310A that includes the image concepts 312A and 312B). More particularly, the image concept modeler module 120 may correlate attributes A-C of the first user with the image concepts 312A and 312B. By repeating this procedure over a population of users, the image concept modeler module 120 may generate a correlative pattern of user attributes and image concepts that appear in images interacted with by the users.

For example, a second user (User 2) may be associated with attributes A, D, and E (sharing attribute A in common with the first user). The image concept modeler module 120 may identify the most prevalent image concepts 312A and 312D from images interacted with by the second user (not illustrated for clarity), similar to the manner in which the most prevalent image concepts 312A and 312B were identified for User 1. Because the image concept 312A is common among the most prevalent image concepts for the first user and the second user, and because the first user and the second user share attribute (A), the image concept modeler module 120 may correlate attribute (A) with the image concept 312A. For example, the image concept modeler module 120 may determine that users having attribute (A) may find image concept 312A appealing based on the image concept model 210.

In some examples, the image concept modeler module 120 may assign a score for each correlated attribute and image concept. The score may indicate a probability that a given image concept will appeal to a user with a corresponding correlated attribute based on the prevalence of correlation observed in the interaction information. For example, the score may include or be based on a probability that an image concept appeals to the user. The score may include the probability itself (which may be expressed as a number from 0 to 1 or other probabilistic representation) or the score may be calculated based on the probability (such as by multiplying the probability by another number to generate a score other than the probability itself). In this manner, a probability that a given image concept may appeal to a user may be determined, given a set of attributes known about the user. Thus, the image concept modeler module 120 may increase the probability that the given image concept appeals to a user (or other users having the same attribute) as more correlations between the image concept and the user (and/or other users who share at least one user attribute with the user) are observed.

In some examples, the image concept modeler module 120 may assign a coefficient to a given image concept 312. The coefficient may include a weight that indicates a level of predictive importance of the given image concept 312. For example, the image concept modeler module 120 may adjust up or down the probability that the given image concept 312 appeals to a user based on the coefficient. Depending on a type of interaction with an image from which the image concept was identified, the probability that the image concept 312 correlates with the reason for the interaction may be increased or decreased through the use of a coefficient.

To illustrate, a user who shares an image with another user may have a greater affinity to image concepts of the image compared to a user who merely clicks on an image. Accordingly, a coefficient applied to image concepts that are shared by a user may be greater than a coefficient applied to image concepts that are clicked by the user. To further illustrate, if a user shared five images having an image concept of "dog" and clicked on five images having an image concept "cat," all other things being equal, the coefficient applied to the image concept "dog" may be higher than the coefficient applied to the image concept "cat." In this example, the fact that the user shared images with dogs versus clicking on images with cats may be used to predict that the image concept "dog" appeals to the user more so than the image concept "cat." Thus, the image concept modeler module 120 may take into account the type of interaction with images when generating the image concept model 210. In this way, image concepts in images that are shared by a user may be assigned with a greater (weighted) probability that those image concepts may appeal to the user as compared to image concepts in images that are merely clicked by the user. Other types of interactions may be weighted with coefficients and various numbers of interactions may be used. For instance, taking photographs may be associated with a higher coefficient than sharing photographs, which may, in turn, be associated with a higher coefficient than clicking on photographs. It should be appreciated that in some examples, the coefficient may be determined by the image concept modeler module 120 based on predetermine rules or weights. In some examples, the coefficient may be provided by a user (e.g., via user input) or automatically determined or adjusted by the image concept modeler module 120.

In some examples, the image concept modeler module 120 may perform the correlations based on cohorts, or groups, of users that are clustered together based on shared attributes. To illustrate, instead of (or in addition to) analyzing an individual user, the image concept modeler module 120 may group users who share similar attributes into a cohort of users, such as 19-year-old college students. Users may be grouped into cohorts based on other attributes as well. The image concept modeler module 120 may identify image concepts from images that each member of the cohort interacted with. The image concept modeler module 120 may identify image concepts that are most prevalent in images interacted with by the cohort. As such, the image concept modeler module 120 may correlate the cohort with the most prevalent image concepts. More specifically, the image concept modeler module 120 may correlate attributes shared by the cohort with the most prevalent image concepts. In this example, the image concept modeler module 120 may identify image concepts that may likely appeal to 19-year-old college students. In some examples, the image concept modeler module 120 may provide the most prevalent image concepts as output, since this information may be useful for generating images for an audience that includes the cohort.

It should be noted that the image concept modeler module 120 may analyze and model a single user. In these examples, the image concept modeler module 120 may be used to generate custom machine learning models for individuals so that content may be customized (automatically as described herein or otherwise) specifically for that individual.

Generating Predictive Modeling Based on Correlations

The image concept modeler module 120 may predict that an image concept may appeal to a particular user. More specifically, the image concept modeler module 120 may generate a prediction, such as a probabilistic score, that an image concept may cause an intended user to interact with includes the image concept. In some examples, the image concept model 210 may generate the probabilistic score that indicates the probability that the image concept will be appealing to the user. In some examples, the image concept model 210 may generate an output that indicates that a combination of two or more image concepts in an image may increase the probability that the image will be interacted with.

To illustrate, the probability that an image will be interacted with by a user may be increased if two or more image concepts that are predicted to appeal to the user are together included in the image. For instance, image concepts "cat" and "shiny ring" may each individually be predicted to appeal to a user. An image including both a cat and a shiny ring may be predicted to appeal to a user at an even higher probability than either image concept alone based on observations of images interacted with that include cats (without shiny rings), shiny rings (without cats), and both cats and shiny rings.

In some examples, the image concept model 210 may include a set of parameters that are each associated with a weight based on training. Each parameter may include an input to the image concept model 210 that may be correlated with an image concept found in an image interacted with by a user. For example, each parameter may include a user attribute and/or other input to the machine learning model that may be correlated with image concepts.

To illustrate, the image concept modeler module 120 may use supervised training in which an image interacted with may be used to correlate image concepts in the image with the parameters such as user attributes. In this way, user attributes may be associated with image concepts detected in images interacted with by those users. As such, the image concept model 210 may, given a user attribute as input, be able to identify image concepts that are predicted to appeal to a user having the user attribute.

For example, as training progresses, the image concept modeler module 120 may update weights associated with each parameter based on a correlation between the parameter to the observed outcome of an image that was interacted with. In a particular example, the image concept modeler module 120 may determine that a particular demographic of a user has an affinity for images that include a particular image concept. It should be appreciated that the particular demographic may be an example of a user attribute. As such, the image concept modeler module 120 may train the image concept model 210 to identify parameters (such as user attributes) that correlate with images that have been interacted with and the image concepts identified from such images. To do so, the image concept modeler module 120 may use a convolutional neural network (CNN) in which each layer in the network may observe a particular parameter and may assign a corresponding weight to that parameter. The image concept modeler module 120 may use other machine learning techniques as well, such as a logistic regression, decision trees, and Bayesian inferences to model probabilities that an image concept will appeal to a user.

Segmentation and Localization Retention

In some examples, the image concept modeler module 120 may retain and use segmentation information and localization information generated from image concept detection, which will be described further with respect to the concept detection module 940 at FIG. 9. As an example, segmentation information may refer to information that identifies individual objects in an image, and localization information may refer to information that provides location context by identifying relationships between objects in an image identified through segmentation. For instance, two objects in an image may be identified through segmentation. Localization information may provide location context that a first object is co-located or nearby a second object. The image concept modeler module 120 may use the segmentation and localization information to provide location context regarding image concepts of an image, as will be discussed further with reference to FIGS. 4A and 4B below.

Figure 4A:
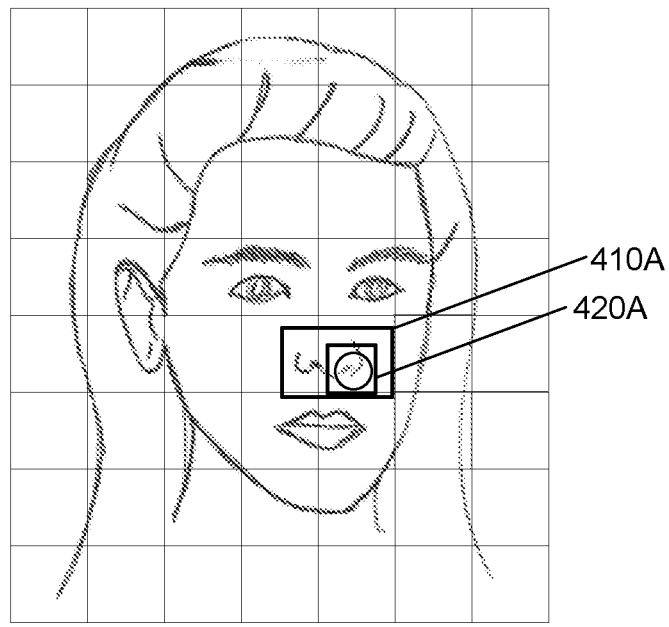
FIGS. 4A-4B illustrate schematic diagrams of an example of retaining and using localization information that includes location context from object detection, according to an example.
Figure 4B:
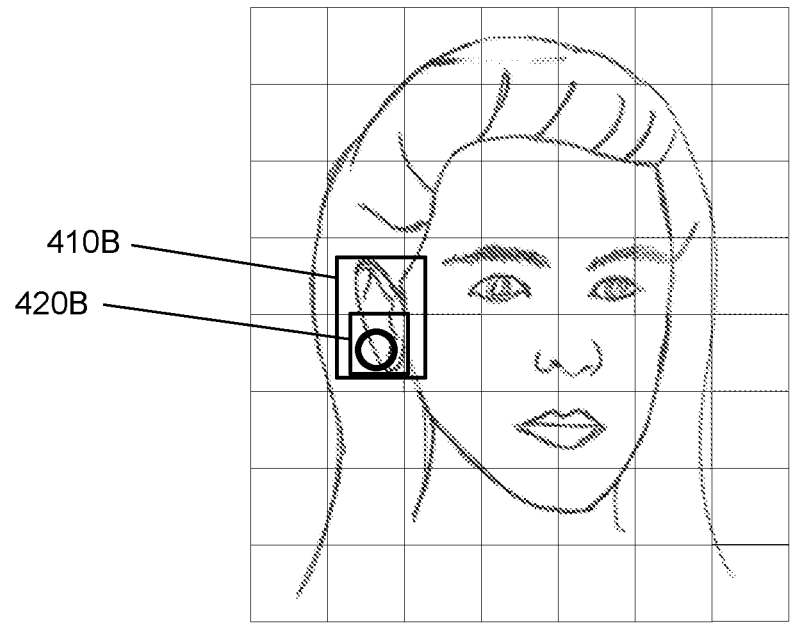

FIGS. 4A-4B illustrate schematic diagrams of an example of retaining and using localization information that includes location context from object detection, according to an example. As shown in FIG. 4A, a first object may be detected in an image 400A and may be identified as a "nose" of a person depicted in the image 400A. The first object may be bounded by a bounding box 410A. A second object may be detected in the image 400A. The second object may be identified as a "ring" and may be bounded by a bounding box 420A co-located within bounding box 410A. The first and second objects may therefore be co-located with one another (e.g., partially or fully overlapping, located proximate to, or near, one another within a threshold number of pixels or other distance indication).

Referring to FIG. 4B, a first object may be detected in an image 400B and may be identified as an "ear" of a person depicted in the image 400B. The first object may be bounded by a bounding box 410B. A second object may be detected in the image 400B. The second object may be identified as a "ring" and may be bounded by a bounding box 420B. The first and second objects may therefore be co-located with one another as described with respect to FIG. 4A. Referring to FIGS. 4A and 4B, an identification of the first object may provide context for the second object. For example, the second object illustrated in FIG. 4A may be determined to be a "nose ring" whereas the second object illustrated in FIG. 4B may be determined to be an "ear ring." The context provided by the first object and location of the first object may facilitate more accurate image concept identifications ("nose ring" as opposed to "ear ring") by the image concept modeler module 120.

As previously noted, the image concept model 210 may be used in various ways, such as to generate recommendations of image concepts to use in candidate images, automatically generate images, and assess candidate images to determine whether they will be interacted with by users. Other examples of uses will be apparent as well.

Recommending Image Concepts for Incorporation into Candidate Images

Figure 5:
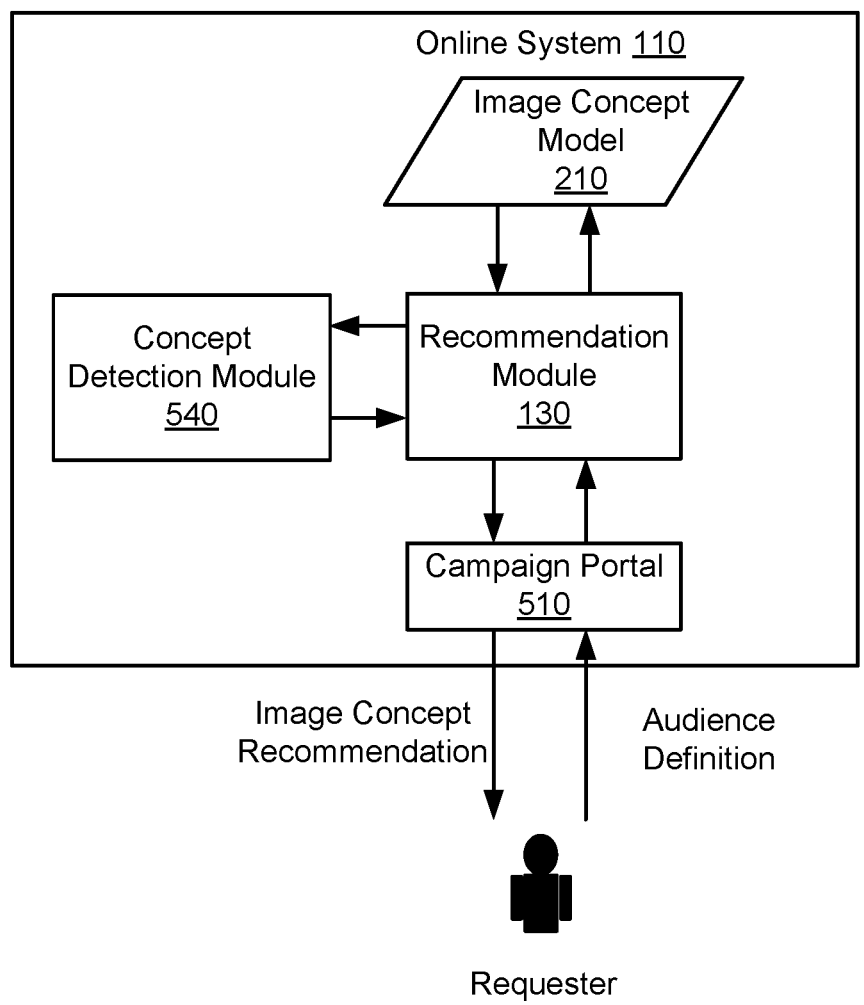
FIG. 5 illustrates a block diagram of an online system that generates image concept recommendations, according to an example.

FIG. 5 illustrates a block diagram of an online system 110 that generates image concept recommendations, according to an example. As shown in FIG. 5, the recommendation module 130 may receive an audience definition from a campaign portal 510. The audience definition may specify an intended audience, including a user or group of users, that is to receive an image. For example, the audience definition may include one or more parameters that specify an attribute of a member of the intended audience. Such attribute may include an age, a gender, a geographic location, and/or other attribute of users that may be stored in the user profile store 960 as described with respect to and illustrated in FIG. 9. The campaign portal 510 may be provided through a web server 930 of FIG. 9 as well. The campaign portal 510 may receive a user input that includes a request to provide image concepts that will likely appeal to an audience specified by the audience definition. For example, a requester such as an advertiser may specify an audience to receive images relating to an ad campaign to market goods or services. The requester may wish to obtain image concepts that may appeal to the audience so that the requester may incorporate the image concepts into images for the ad campaign.

The recommendation module 130 may use the image concept model 210 to generate an image concept recommendation, as described above. The image concept recommendation may include an identification of one or more image concepts predicted to appeal to the audience, as determined based on application of the parameters from the audience definition to the image concept model 210. To illustrate, a parameter may specify that an intended audience should include users who are 19 years old. The parameter of "19 years old" may be applied to the image concept model 210, which generates a prediction that certain image concepts will satisfy the input parameter. In other words, the image concept model 210 may identify image concepts correlated to appeal to 19-year-old users based on observations of prior user interaction data.

In some examples, the recommendation module 130 may provide a ranked listing of image concepts predicted to appeal to the audience. For example, the recommendation module 130 may order the ranked listing based on respective probabilities that each image concept may appeal to the user. Thus, in these examples, the image concept recommendation may include a ranked listing of image concepts.

In some examples, the recommendation module 130 may parse images to provide examples of images that include recommended image concepts. The images may include untagged or tagged images in the content data store 980, third party images such as from a stock image repository accessible from a third party (such as through an API), and/or other images accessible to the online system 110. For example, the recommendation module 130 may identify a sample image that includes a recommended image concept and provide the sample image with the recommended image concept in the image concept recommendation.

To illustrate, the recommendation module 130 may recommend that image concept of dogs will appeal to an audience. The recommendation module 130 may access images in content data store 980 or other image repository such as a stock image repository to identify images that include images of dogs. For example, when the accessed images are not previously tagged with image concepts, the recommendation module 130 may use the concept detection module 540 (which may include an example of a concept detection module 940 illustrated in FIG. 9) to identify image concepts in the images and determine which ones of the images include the image concept "dogs". Based on the foregoing processing, the recommendation module 130 may provide sample images that include the image concept dogs along with the recommendation so as to provide examples of images that include the image concept dogs. When the sample images have been previously tagged, the recommendation module 130 may identify sample images that have been tagged with the image concept dogs based on the tags associated with the tagged images. In some examples, the recommendation module 130 may use the image generation module 140 to generate sample images that includes one or more of the recommended image concepts. In either of the foregoing examples, the recommendation module 130 may provide the requester or others with an example of an image that includes a recommended image concept to provide an indication of what is being recommended.

In some examples, the recommendation module 130 may include location context information retained from the image concept modeler module 120. For instance, for a recommended image concept of "shiny ring," the recommendation module 130 may provide the location context, such as indicating that the shiny ring is associated with a nose or other body part in images that were interacted with by the intended audience or a location or position of the shiny ring in the images. In this example, the recommendation module 130 may provide an image of the shiny ring image concept as part of the image concept recommendation.

Automatically Generating Custom Images Based on Image Concepts

Figure 6:
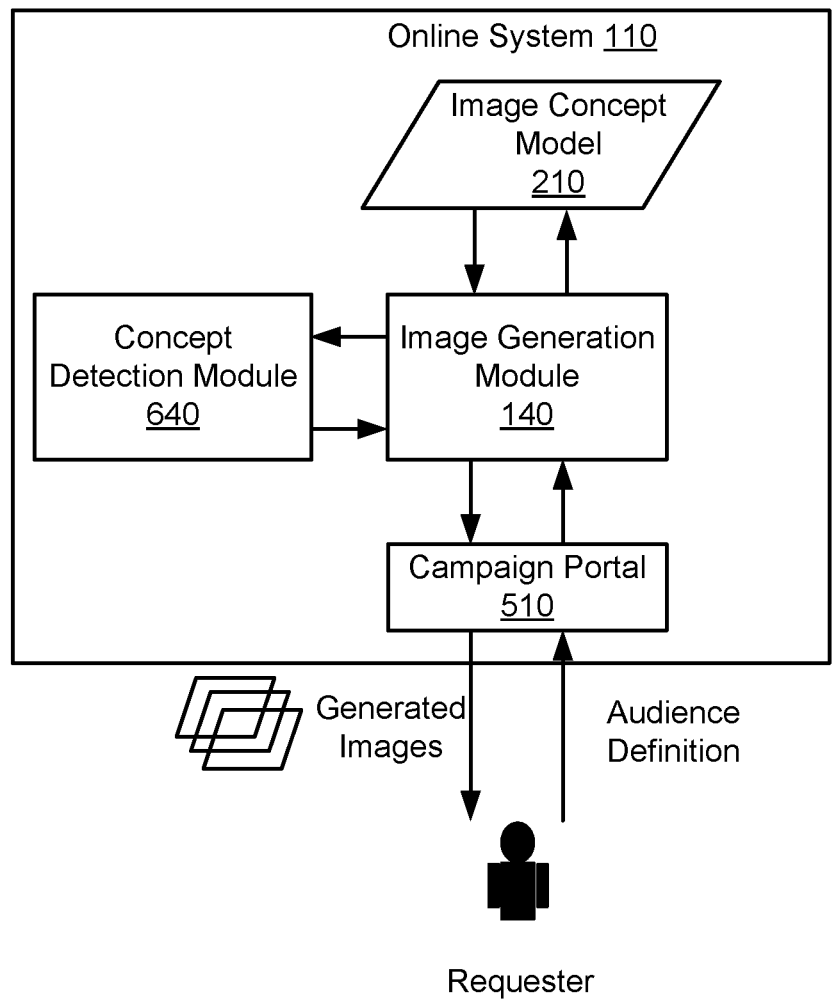
FIG. 6 illustrates a block diagram of an online system that automatically generates images using image concepts, according to an example.

FIG. 6 illustrates a block diagram of an online system 110 that automatically generates images using image concepts, according to an example. As shown in FIG. 6, the image generation module 140 may receive, from the campaign portal 510, a request that includes an audience definition and generate an image having image concepts predicted to appeal to the audience. In some examples, the image generation module 140 may include a Generative Adversarial Network (GAN) that is trained to generate candidate images based on the image concepts identified by the image concept model 210. For example, the GAN may include a generator that generates candidate images and a discriminator that assesses whether the candidate image will be of interest to an audience. The generator may, for example, apply image style transfer techniques to automatically (programmatically based on machine learned information such as from the discriminator) generate candidate images. In particular, the generator may apply an image concept to modify an existing image or may combine two image concepts to create a new image.

The discriminator may use the image concept model 210 to identify image concepts that are predicted to be of interest to the audience. The discriminator may use the concept detection module 640 (which may include an example of a concept detection module 940 illustrated in FIG. 9) to identify image concepts included in the candidate images generated by the generator. The discriminator may compare the image concepts predicted to be of interest to the audience with the image concepts detected in the candidate images. If one or more of the image concepts predicted to be of interest to the audience are not included in the candidate images, then the discriminator may determine that the candidate images may not be of interest to the audience. The discriminator may indicate to the generator that the candidate images may not be of interest to the audience as well as the reasons for this determination (such as an identification of any image concepts that are missing from the candidate image). The generator may use this feedback information from the discriminator to generate more convincing images, such as by using any missing image concepts or combination of image concepts predicted to appeal to users specified by the audience definition.

Assessing Input Images to Predict Interaction

Figure 7:
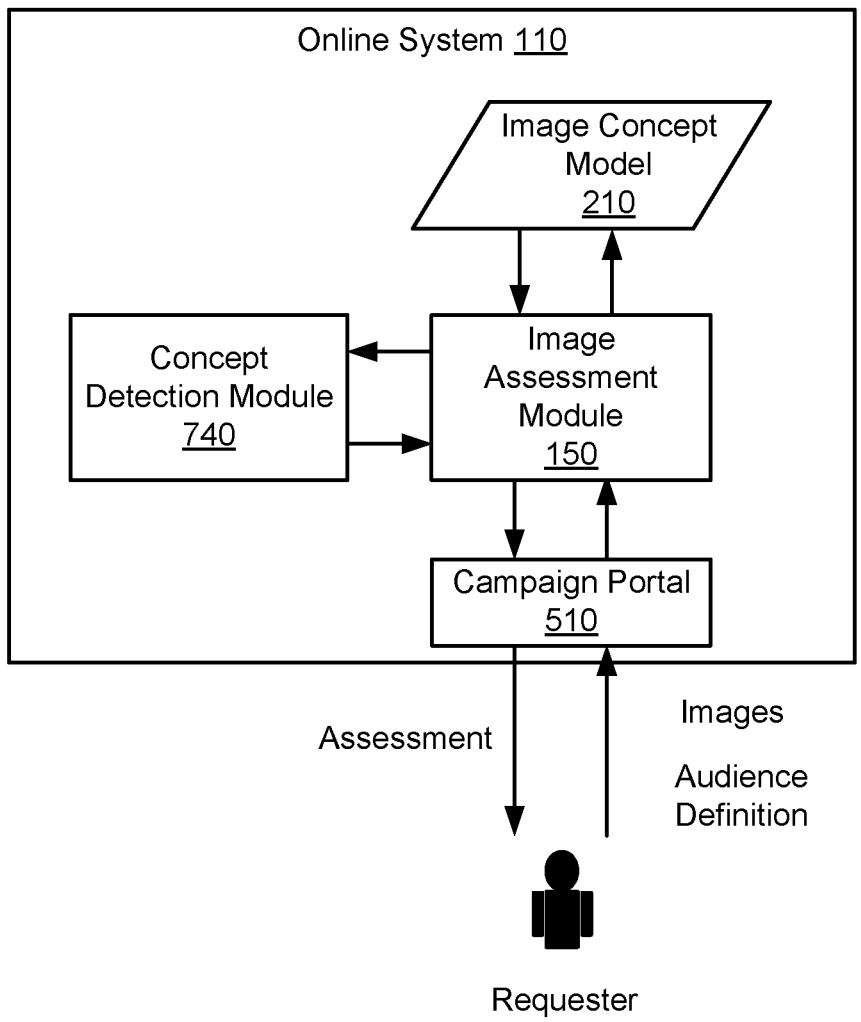
FIG. 7 illustrates a block diagram of an online system that assesses images based on image concepts, according to an example.

FIG. 7 illustrates a block diagram of an online system 110 that assesses images based on image concepts, according to an example. As shown in FIG. 7, the image assessment module 150 may receive, via the campaign portal 510, a request based on user input that includes an audience definition and one or more candidate images to be assessed. For example, the requester may generate and provide candidate images for a campaign and may use the online system 110 to provide an assessment of the likelihood that the images will be interacted with by the audience specified in the audience definition.

Figure 9:
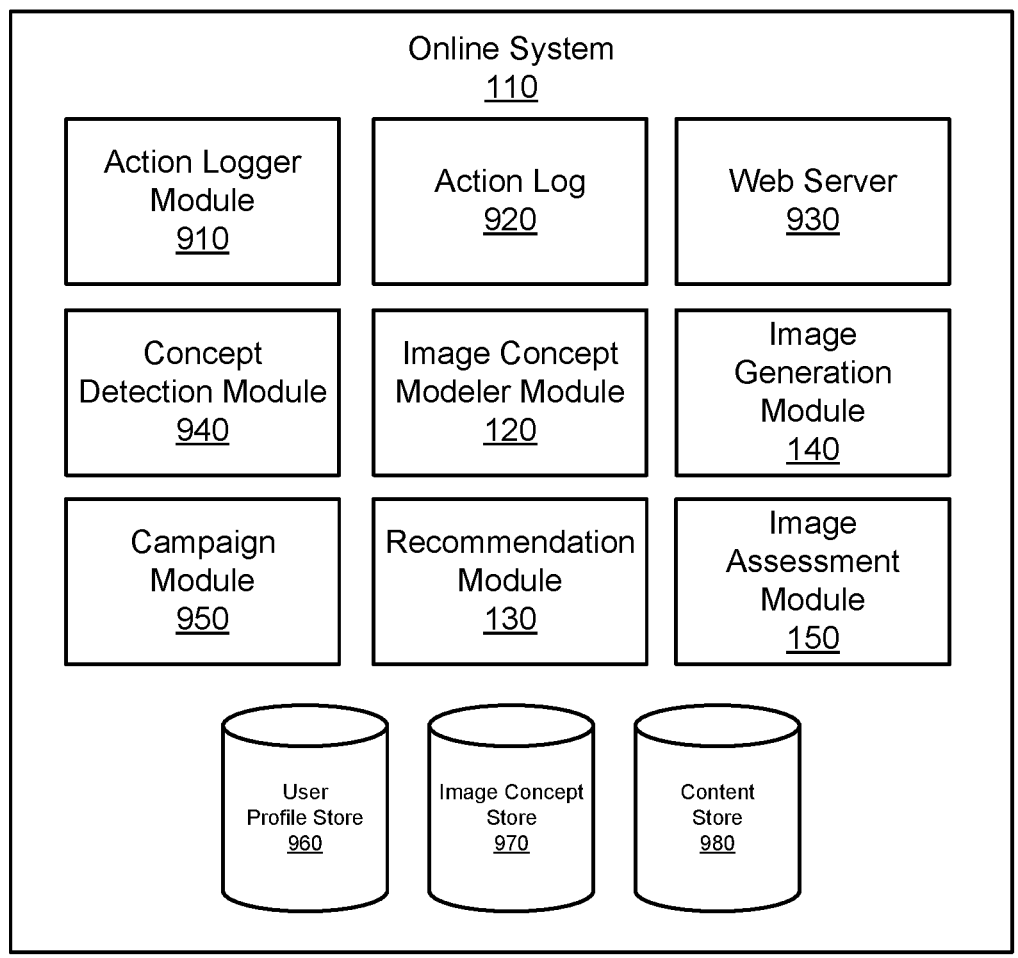
FIG. 9 illustrates a block diagram of an online system, according to an example.

The image assessment module 150 may use the concept detection module 740 (which may include an example of a concept detection module 940 illustrated in FIG. 9) to identify image concepts in each image. The image assessment module 150 may use the image concept model 210 to generate predictions of whether the image concepts will appeal to the audience. The image assessment module 150 may generate a score for the candidate image based on the predictions. For example, the score may be based on image concepts detected in the image and the probability that each image concept will appeal to the audience. The image assessment module 150 may provide an image assessment that includes the score. In some instances, the image assessment module 150 may compare the score to a threshold score to provide a prediction of whether the image will be interacted with by the audience. The threshold score may be predefined by the requester or by the online system 110.

Filtering the Output Based on Domain Parameters

In some examples, the image concept modeler module 120, recommendation module 130, image generation module 140, and/or the image assessment module 150 may filter output based on one or more domain parameters. A domain parameter may specify a particular subject matter domain to which the output should be limited. For example, the requester may wish to generate a campaign to market a car, in which case the domain parameter may specify an automotive domain. Responsive to the domain parameter, the predicted image concepts may be filtered to include only those related to the automotive domain. In some examples, the domain parameter may specify a season, time of year, holiday, and/or other temporal domain (since image concepts may change over time/during the year).

Retraining

Figure 8:
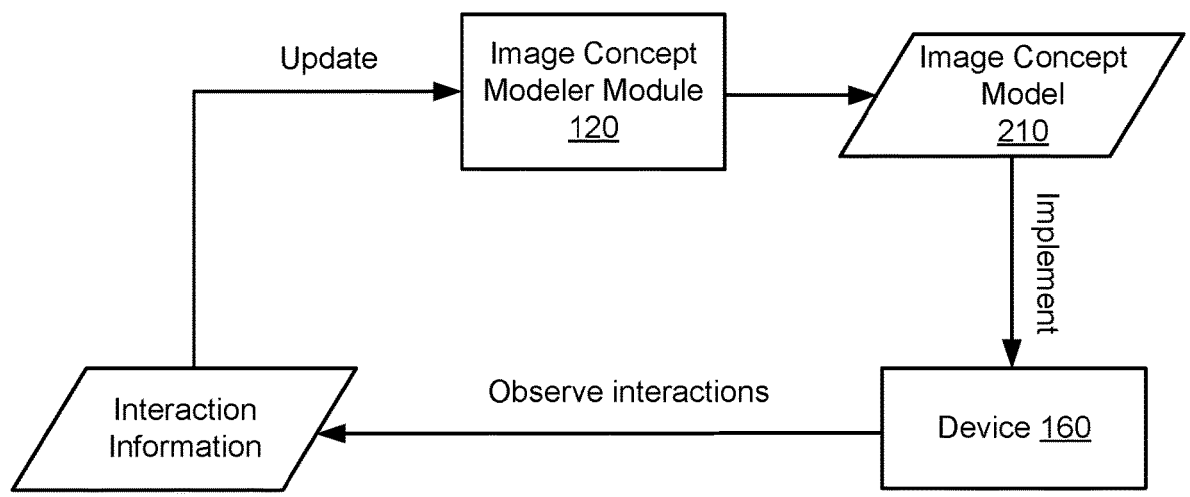
FIG. 8 illustrates a block diagram of retraining an image concept model based on monitored interactions with images, according to an example.

FIG. 8 illustrates a block diagram of retraining an image concept modeler module 120 based on monitored interactions with images, according to an example. As shown, the image concept modeler module 120 may refine the image concept model 210 based on results of previously generated images that were based on the image concept model. By learning from user interactions with various content over time, the online system 110 may refine the image concept model 210. For instance, the image concept modeler module 120 may adjust weights of each attribute up or down to impact whether (or how much) a particular user attribute correlates with an image concept based on user interactions with images containing the image concept.

To illustrate, an audience definition may specify that 19-year-old users should be included in the audience. The image concept model 210 may identify "cats" that may appeal to the "19-year-old" users. Candidate images including "cats" may be provided to the audience. Such candidate images may be created by the online system 110, obtained from stock imagery, or created by a requester. The candidate images may be provided to the audience by the online system 110. The online system 110 may monitor performance of the candidate images. For example, the online system 110 may determine whether or not the candidate images were interacted with by the audience. The image concept modeler module 120 may retrain (such as update) the image concept model 210 based on the number of interactions with the candidate images. For example, the image concept model 210 may be revised based on the new interaction information for the candidate images together with the previous interaction information used to initially train the image concept model 210. In some instances, the image concept modeler module 120 may ignore any stale interaction information older than a predefined threshold age so as make predictions based on only current data (such as data whose age is not older than the threshold age).

Having described the image concept modeler module 120 and various examples of uses of the image concept model 210, attention will now turn to a further example architecture of the online system 110. FIG. 9 illustrates a block diagram of the online system 110, according to an example. As shown, the online system 110 may include an action logger module 910, an action log 920, a web server 930, a concept detection module 940, a campaign module 950, the image concept modeler module 120, the recommendation module 130, the image generation module 140, the image assessment module 150, a user profile store 960, an image concept store 970, and a content store 980. Each of the action logger module 910, an action log 920, a web server 930, a concept detection module 940, a campaign module 950, the image concept modeler module 120, the recommendation module 130, the image generation module 140, and the image assessment module 150 may include hardware components (such as a processor 1212 illustrated in FIG. 12), software (e.g., instructions executable by the processor 1212), or a combination of both hardware and software.

In some examples, the online system 110 may include additional, fewer, or different components for various applications. Components such as network interfaces, security functions, load balancers, fail over servers, management and network operations consoles, and the like are not shown so as to not obscure the details of the system architecture.

Each user of the online system 110 may be associated with a user profile, which may be stored in the user profile store 960. A user profile may include attributes (such as attributes A-E illustrated in FIG. 3) of a user. The user profile may include declarative information about the user that was explicitly shared by the user and may also include profile information inferred by the online system 110. In some examples, a user profile may include multiple data fields, each describing one or more attributes of a corresponding online system user.

Examples of information stored in a user profile include biographic, demographic, and other types of descriptive information, such as work experience, educational history, gender, hobbies or preferences, location and the like. A user profile may also store other information provided by the user, such as, for example, images or videos (which may be converted to a series of still images or otherwise processed for tagging as described herein). In certain examples, images of users may be tagged with information identifying the online system users displayed in an image, with information identifying the images in which a user is tagged stored in the user profile of the user. A user profile in the user profile store 960 may also maintain references to actions by the corresponding user performed on content items in the content store 980 and stored in the action log 920.

While user profiles in the user profile store 960 are frequently associated with individuals, allowing individuals to interact with each other via the online system 110, user profiles may also be stored for entities such as businesses or organizations. This allows an entity to establish a presence on the online system 110 for connecting and exchanging content with other online system users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The content store 980 stores objects that each represents various types of content. Examples of content represented by an object include a page post, a status update, a photograph, a video, a link, a shared content item, a gaming application achievement, a check-in event at a local business, an advertisement, a brand page, or any other type of content. The foregoing objects may each include one or more images for which user interactions are monitored. Online system users may create objects stored by the content store 980, such as status updates, photos tagged by users to be associated with other objects in the online system 110, events, groups, or applications. In some examples, objects, such as advertisements, may be received from third party web sites (such as from a third party system 170) or third party applications separate from the online system 110. In one example, objects in the content store 980 represent single pieces of content, or content "items" or "stories." Hence, online system users are encouraged to communicate with each other by posting text and content items of various types of media to the online system 110 through various communication channels. This increases the amount of interaction of users with each other and increases the frequency with which users interact within the online system 110.

One or more content items included in the content store 980 include content for presentation to a user and a bid amount. The content is text, image, audio, video, or any other suitable data presented to a user. In various examples, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 110 if content in the content item is presented to a user, if the content in the content item receives a user interaction when presented, or if any suitable condition is satisfied when content in the content item is presented to a user. For example, the bid amount included in a content item specifies a monetary amount that the online system 110 receives from a user who provided the content item to the online system 110 if content in the content item is displayed. In some examples, the expected value to the online system 110 of presenting the content from the content item may be determined by multiplying the bid amount by a probability of the content of the content item being accessed by a user.

In various examples, a content item includes various components capable of being identified and retrieved by the online system 110. Example components of a content item include: a title, text data, image data, audio data, video data, a landing page, a user associated with the content item, or any other suitable information. The online system 110 may retrieve one or more specific components of a content item for presentation in some examples. For example, the online system 110 may identify a title and an image from a content item and provide the title and the image for presentation rather than the content item in its entirety.

Various content items may include an objective identifying an interaction that a user associated with a content item would like other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 110 logs interactions between users presented with the content item or with objects associated with the content item. Additionally, the online system 110 receives compensation from a user associated with content item as online system users perform interactions with a content item that satisfy the objective included in the content item.

Additionally, a content item may include one or more targeting criteria specified by the user who provided the content item to the online system 110. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one example, targeting criteria may specify actions or types of connections between a user and another user or object of the online system 110. Targeting criteria may also specify interactions between a user and objects performed external to the online system 110, such as on a third party system 170. For example, targeting criteria identify users that have taken a particular action, such as sent a message to another user, used an application, joined a group, left a group, joined an event, generated an event description, purchased or reviewed a product or service using an online marketplace, requested information from a third party system 170, installed an application, or performed any other suitable action. Including actions in targeting criteria allows users to further refine users eligible to be presented with content items. As another example, targeting criteria identifies users having a connection to another user or object or having a particular type of connection to another user or object.

The action logger module 910 may receive communications about user actions internal to and external to the online system 110 and populates the action log 920 with information about these user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 920.

The action log 920 may be used by the online system 110 to track user actions on the online system 110, as well as actions on third party system 170 that communicate information to the online system 110. Users may interact with various objects on the online system 110, and information describing these interactions is stored in the action log 920. Examples of interactions with objects include: commenting on posts, sharing links, checking-in to physical locations via a device 160, 162, accessing content items, and any other suitable interactions. Additional examples of interactions with objects on the online system 110 that are included in the action log 920 include: commenting on a photo album, communicating with a user, establishing a connection with an object, joining an event, joining a group, creating an event, authorizing an application, using an application, expressing a preference for an object (e.g., "liking" the object), and engaging in a transaction. Additionally, the action log 920 may record a user's interactions with advertisements on the online system 110 as well as with other applications operating on the online system 110. In some examples, data from the action log 920 is used to infer interests or preferences of a user, augmenting the interests included in the user's user profile and allowing a more complete understanding of user preferences.

The action log 920 may also store user actions taken on a third party system 170, such as an external website, and communicated to the online system 110. For example, an e-commerce website may recognize a user of an online system 110 through a social plug-in enabling the e-commerce website to identify the user of the online system 110. Because users of the online system 110 are uniquely identifiable, e-commerce web sites, such as in the preceding example, may communicate information about a user's actions outside of the online system 110 to the online system 110 for association with the user. Hence, the action log 920 may record information about actions users perform on a third party system 170, including webpage viewing histories, advertisements that were engaged, purchases made, and other patterns from shopping and buying. Additionally, actions a user performs via an application associated with a third party system 170 and executing on a device 160, 162 may be communicated to the action logger module 910 by the application for recordation and association with the user in the action log 920.

The web server 930 links the online system 110 via the network 102 to the devices 160, 162, as well as to the one or more third party systems 170. The web server 930 serves web pages, as well as other content, such as JAVA®, FLASH®, XML, and so forth. The web server 930 may receive and route messages between the online system 110 and the devices 160, 162 for example, instant messages, queued messages (e.g., email), text messages, short message service (SMS) messages, or messages sent using any other suitable messaging technique. A user may send a request to the web server 930 to upload information (e.g., images or videos) that are stored in the content store 980. Additionally, the web server 930 may provide application programming interface (API) functionality to send data directly to native mobile device operating systems, such as IOS®, ANDROID™, or BlackberryOS.

The concept detection module 940 may identify an image concept in an image based on computer vision techniques. An image as used herein may include a visual representation in electronic form. The visual representation may include an actual representation such as a photograph, a computer-generated image, a drawing, and/or other visual representation that may be stored electronically and analyzed using computer vision techniques. The electronic format of an image may include video (which may be converted to a series of still images), a still image, a hologram, an augmented display image, a document (including a scanned document or photograph), and/or other type of format.

The concept detection module 940 may recognize objects, colors, moods (based on facial expression recognition, and/or correlating objects or colors with moods), and/or other image concepts based on object detection. In some examples, object detection (and classification) may be based on one or more training datasets, which may include the MS-COCO, ImageNet, Open Images Dataset, VisualQA, CIFAR-10, and/or other training datasets, including custom datasets. Object detection techniques used by the concept detection module 940 may include (for classification, localization, object detection, instance segmentation): Detectron, Retinanet, Single shot detector (SSD) such as a single shot multi-box detector, You Only Look Once (YOLO), and/or others. Techniques based on classification may operate in two stages. In the first state, the interesting regions of an image may be selected and classified based on convolutional neural networks. Examples include the Region-based Convolutional Neural Network (RCNN), Fast-RCNN and Faster-RCNN. Algorithms based on regression may predict classes and bounding boxes (or other object delimiters) for an entire image in a single pass. Examples may include the YOLO technique.

Whichever technique is used, the concept detection module 940 may pre-tag images before the images are provided by the online system 110 to users, such through devices 160. In some examples, the concept detection module 940 may detect concepts as they are uploaded to the online system 110. For example, when images are shared or otherwise uploaded to the online system 110, the online system 110 may detect image concepts from the images.

In some examples, the concept detection module 940 may periodically access a third party stock image repository to identify image concepts in stock images. In either example, the result of concept detection may be stored in the image concept store 970. For example, an identifier of the image (whether an internal image identifier or a third party image identifier) may be stored in association with one or more identifications of image concepts found in the image. The source of the images may include user galleries, shared content, websites visited, third party stock image repositories, and/or other sources so long as users have, for example, opted in to use object detection services.

In some examples, the campaign module 950 may provide the campaign portal 510 through which an audience definition may be received. The image may be part of, for example, marketing content, informational content, or other content that is intended for a user or group of users. Thus, the campaign module 950 may receive an audience definition from a requester such as an advertiser to specify a campaign that includes one or more images to be provided to an audience specified in the audience definition.

In some examples, the campaign module 950 may monitor the output of the recommendation module 130, image generation module 140, and image assessment module 150. For example, the campaign module 950 may monitor a campaign that includes images generated based on the output of the recommendation module 130, image generation module 140, and image assessment module 150. For example, the campaign module 950 may monitor the performance of images resulting from these modules and associate them with campaign identifiers so that their performance may be tracked. Such tracking may facilitate feedback into the image concept model 210. In this way, recommendations, automatically generated images, and image assessments may be improved over time.

The campaign module 950 may provide the audience definition to the recommendation module 130, the image generation module 140, and/or the image assessment module 150 to facilitate the generation of images for the campaigns. The recommendation module 130, the image generation module 140, and the image assessment module 150 may each use the image concept model 210 from the image concept modeler module 120 to generate respective outputs.

Figure 10:
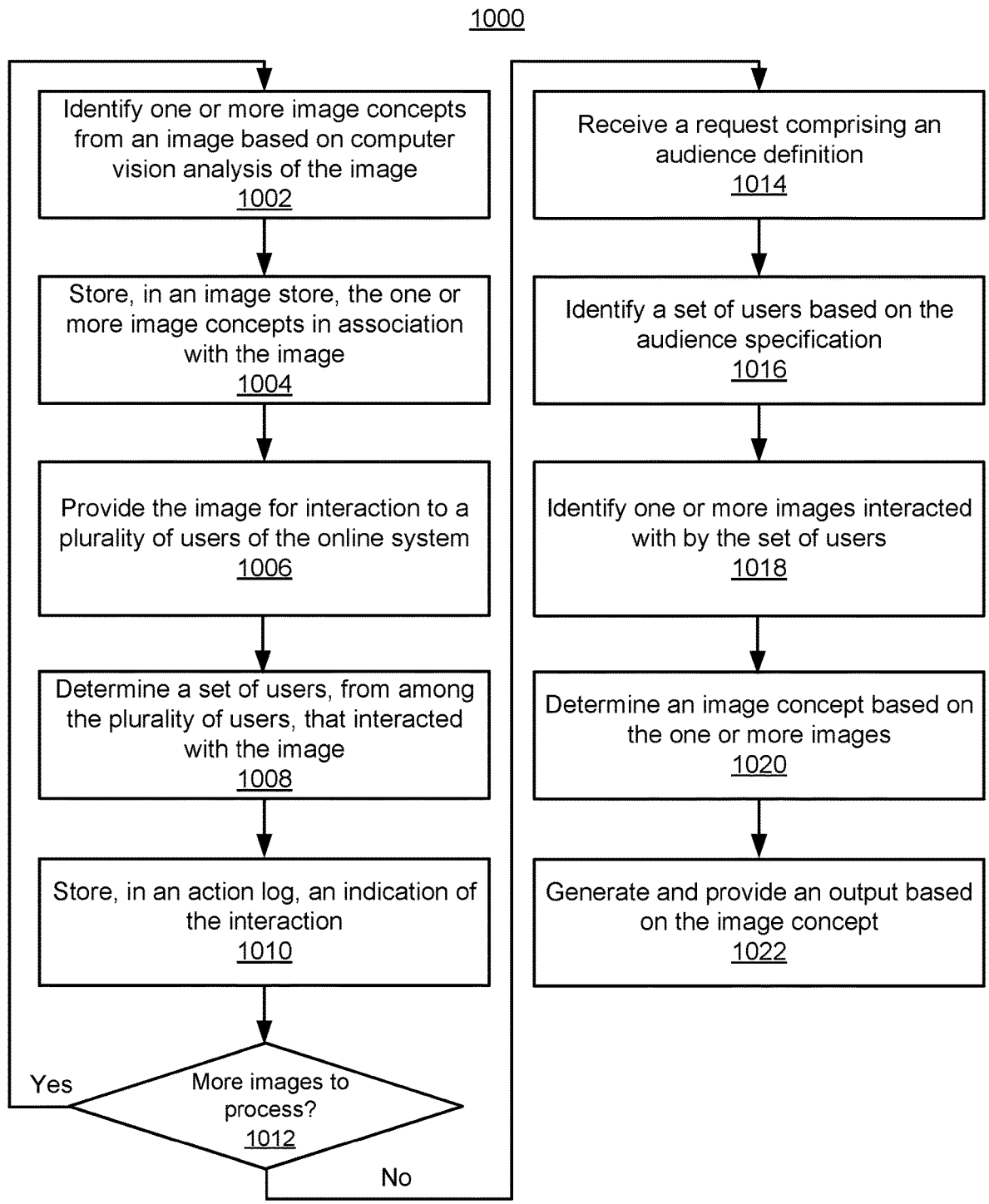
FIG. 10 illustrates a method of modeling image concept preferences, according to an example.

FIG. 10 illustrates a method 1000 of modeling image concept preferences, according to an example. Although the method 1000 is primarily described as being performed by the online system 110 as shown in FIGS. 1 and 5-9, the method 1000 may be executed or otherwise performed by other systems, or a combination of systems. Each block shown in FIG. 10 may further represent one or more processes, methods, or subroutines, and one or more of the blocks may include machine-readable instructions stored on a non-transitory computer readable medium and executed by a processor or other type of processing circuit to perform one or more operations described herein.

At 1002, the online system 110 may identify one or more image concepts from an image (e.g., based on computer vision analysis of the image). For example, the concept detection module 940 may analyze an obtained image, identify one or more image concepts in the image using one or more AI techniques, and tag the image with the identified image concepts using various AI techniques. At 1004, the online system 110 may store, in an image store (such as image concept store 970), the one or more image concepts in association with the image. At 1006, the online system 110 may provide the image for interaction to a plurality of users of the online system 110. For example, the online system 110 may provide the image through various channels such as websites, social media accounts, and/or other channels of the online system 110.

At 1008, the online system 110 may determine a set of users, from among the plurality of users, that interacted with the image. At 1010, the online system 110 may store, in an action log (e.g., the action log 920 of FIG. 9), an indication of the interaction. At 1012, the online system 110 may determine whether additional images are to be processed. If additional images are to be processed, the online system 110 may return to 1002. If not, the online system 110 may proceed to 1014.

At 1014, the online system 110 may receive a request comprising an audience definition. At 1016, the online system 110 may identify a set of users based on the audience definition. At 1018, the online system 110 may identify one or more images interacted with by the set of users. For example, the online system may do so based on the action log. At 1020, the online system 110 may determine an image concept based on the one or more images. At 1022, the online system 110 may generate and provide an output based on the image concept. The output may include a recommendation to include the image concept, an automatically generated image based on the image concept, an assessment of a candidate image, and/or other data based on the image concept.

Figure 11:
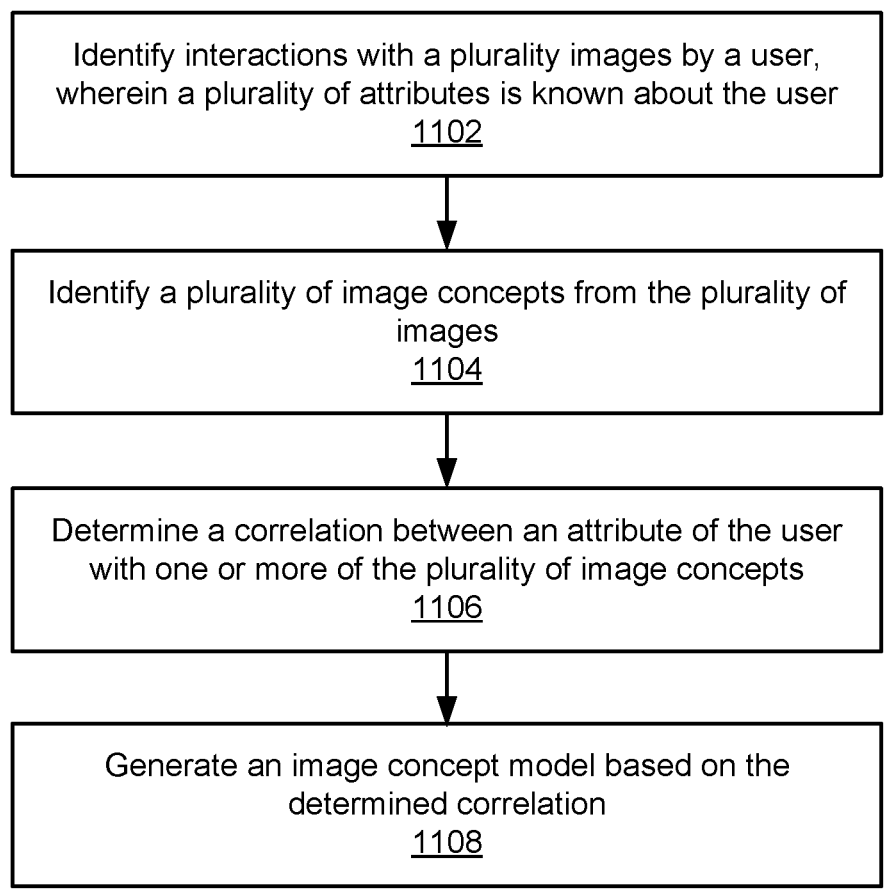
FIG. 11 illustrates a method of generating an image concept model, according to an example.

FIG. 11 illustrates a method 1100 of generating an image concept model, according to an example. Although the method 1100 is primarily described as being performed by the online system 110 as shown in FIGS. 1 and 5-9, the method 1000 may be executed or otherwise performed by other systems, or a combination of systems. Each block shown in FIG. 11 may further represent one or more processes, methods, or subroutines, and one or more of the blocks may include machine-readable instructions stored on a non-transitory computer readable medium and executed by a processor or other type of processing circuit to perform one or more operations described herein.

At 1102, the online system 110 may identify interactions with a plurality images by a user, wherein a plurality of attributes is known about the user. At 1104, the online system 110 may identify a plurality of image concepts from the plurality of images. At 1106, the online system 110 may determine a correlation between an attribute of the user with one or more of the plurality of image concepts. At 1108, the online system 110 may generate an image concept model based on the determined correlation.

Figure 12:
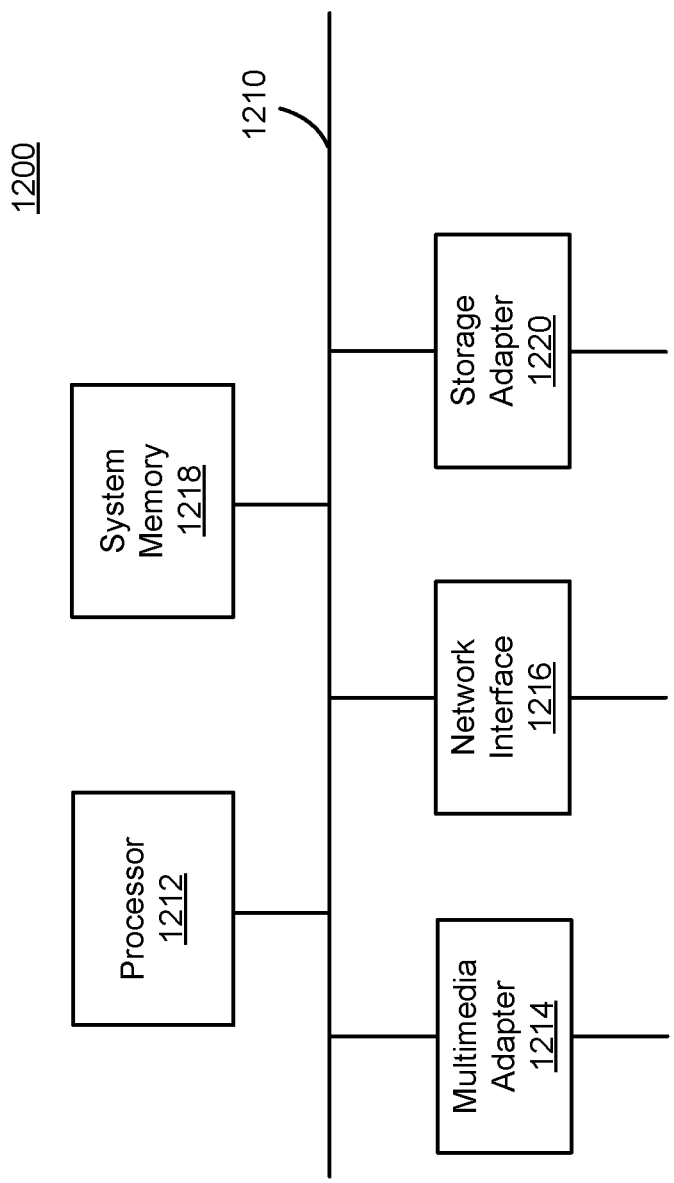
FIG. 12 illustrates a computer system for automated visual suggestions based on object detection and analysis of images, according to an example.

FIG. 12 illustrates a computer system 1200 for automated visual suggestions based on object detection and analysis of images, according to an example. The computer system 1200 may be part of or include the online system 110 to perform the functions and features described herein. The computer system 1200 may include, among other things, an interconnect 1210, a processor 1212, a multimedia adapter 1214, a network interface 1216, a system memory 1218, and a storage adapter 1220.

The interconnect 1210 may interconnect various subsystems, elements, and/or components of the computer system 1200. As shown, the interconnect 1210 may be an abstraction that may represent any one or more separate physical buses, point-to-point connections, or both, connected by appropriate bridges, adapters, or controllers. In some examples, the interconnect 1210 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 1210 may allow data communication between the processor 1212 and system memory 1218, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 1212 may be the central processing unit (CPU) of the computing device and may control overall operation of the computing device. In some examples, the processor 1212 may accomplish this by executing software or firmware stored in system memory 1218 or other data via the storage adapter 1220. The processor 1212 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1214 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 1216 may provide the computing device with an ability to communicate with a variety of remove devices over a network (e.g., network 102 of FIG. 1) and may include, for example, an Ethernet adapter, a Fibre Channel adapter, and/or other wired- or wireless-enabled adapter. The network interface 1216 may provide a direct or indirect connection from one network element to another, and facilitate communication and between various network elements.

The storage adapter 1220 may connect to a standard computer readable medium for storage and/or retrieval of information, such as a fixed disk drive (internal or external).

Many other devices, components, elements, or subsystems (not shown) may be connected in a similar manner to the interconnect 1210 or via a network (e.g., network 102 of FIG. 1). Conversely, all of the devices shown in FIG. 12 need not be present to practice the present disclosure. The devices and subsystems can be interconnected in different ways from that shown in FIG. 12. Code to implement the present disclosure may be stored in computer-readable storage media such as one or more of system memory 1218 or other storage. Code to implement the present disclosure may also be received via one or more interfaces and stored in memory. The operating system provided on computing system 1200 may be MS-DOS®, MS-WINDOWS®, OS/2®, OS X®, IOS®, ANDROID®, UNIX®, Linux®, or another operating system.

It should be noted that the functionality described herein may be subject to one or more privacy policies, described below, enforced by the online system 110 that may bar use of images for concept detection, recommendation, generation, and analysis.

In particular examples, one or more objects (e.g., content or other types of objects) of a computing system may be associated with one or more privacy settings. The one or more objects may be stored on or otherwise associated with any suitable computing system or application, such as, for example, an online system 110, a device 160, a device 162, a third party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the online system 110 or shared with other systems (e.g., a third party system 170). Although this disclosure describes using particular privacy settings in a particular manner, this disclosure contemplates using any suitable privacy settings in any suitable manner.

In particular examples, the online system 110 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the online system 110 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third party systems 170, particular applications (e.g., third party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the online system 110 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the online system 110 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The online system 110 may access such information in order to provide a particular function or service to the first user, without the online system 110 having access to that information for any other purposes. Before accessing, storing, or using such objects or information, the online system 110 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 110.

In particular examples, a user may specify whether particular types of objects or information associated with the first user may be accessed, stored, or used by the online system 110. As an example and not by way of limitation, the first user may specify that images sent by the first user through the online system 110 may not be stored by the online system 110. As another example and not by way of limitation, a first user may specify that messages sent from the first user to a particular second user may not be stored by the online system 110. As yet another example and not by way of limitation, a first user may specify that all objects sent via a particular application may be saved by the online system 110.

In particular examples, privacy settings may allow a first user to specify whether particular objects or information associated with the first user may be accessed from particular devices 160, 162 or third party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The online system 110 may provide default privacy settings with respect to each device, system, or application, and/or the first user may be prompted to specify a particular privacy setting for each context. As an example and not by way of limitation, the first user may utilize a location-services feature of the online system 110 to provide recommendations for restaurants or other places in proximity to the user. The first user's default privacy settings may specify that the online system 110 may use location information provided from a device 160, 162 of the first user to provide the location-based services, but that the online system 110 may not store the location information of the first user or provide it to any third party system 170. The first user may then update the privacy settings to allow location information to be used by a third party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The online system 110 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the online system 110 may use a user's previous activities and calculated moods, emotions, or sentiments to determine a present mood, emotion, or sentiment. A user who wishes to enable this functionality may indicate in their privacy settings that they opt in to the online system 110 receiving the inputs necessary to determine the mood, emotion, or sentiment. As an example and not by way of limitation, the online system 110 may determine that a default privacy setting is to not receive any information necessary for determining mood, emotion, or sentiment until there is an express indication from a user that the online system 110 may do so. By contrast, if a user does not opt in to the online system 110 receiving these inputs (or affirmatively opts out of the online system 110 receiving these inputs), the online system 110 may be prevented from receiving, collecting, logging, or storing these inputs or any information associated with these inputs. In particular examples, the online system 110 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the online system 110 may use the user's mood, emotion, or sentiment to provide newsfeed items, pages, friends, or advertisements to a user. The user may specify in their privacy settings that the online system 110 may determine the user's mood, emotion, or sentiment. The user may then be asked to provide additional privacy settings to indicate the purposes for which the user's mood, emotion, or sentiment may be used. The user may indicate that the online system 110 may use his or her mood, emotion, or sentiment to provide newsfeed content and recommend pages, but not for recommending friends or advertisements. The online system 110 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the online system 110 may be restricted in its access, storage, or use of the objects or information. The online system 110 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the online system 110 may temporarily store the message in a content data store until the second user has viewed or downloaded the message, at which point the online system 110 may delete the message from the data store 164. As another example and not by way of limitation, continuing with the prior example, the message may be stored for a specified period of time (e.g., 2 weeks), after which point the online system 110 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the online system 110 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the online system 110. The user's privacy settings may specify that such information may be used only for particular processes, such as authentication, and further specify that such information may not be shared with any third party system 170 or used for other processes or applications associated with the online system 110. As another example and not by way of limitation, the online system 110 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third party system 170 or used by other processes or applications associated with the online system 110. As another example and not by way of limitation, the online system 110 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third party system 170 or used by other processes or applications associated with the online system 110.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The online system 110 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the online system 110 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the online system 110 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the online system 110 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the online system 110 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the online system 110 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the online system 110 may send a reminder to the user to confirm his or her privacy settings every six months or after every ten photo posts. In particular examples, privacy settings may also allow users to control access to the objects or information on a per-request basis. As an example and not by way of limitation, the online system 110 may notify the user whenever a third party system 170 attempts to access information associated with the user, and require the user to provide verification that access should be allowed before proceeding.

It should be appreciated that the components of the online system 110 described herein may operate in partial or full capacity, or it may be removed entirely. It should also be appreciated that image concept analysis described herein with respect to the online system 110, for example, may also be performed partially or in full by other various components of the overall system. Furthermore, although examples described herein include use of audience definitions, the online system 110 may be used in other ways as well. For instance, the online system 110 may provide customized content to users based on the image concept analysis described herein. For example, users may be provided with customized images while on and off the online system 110 based on their previous interactions with images and the image concepts identified therefrom.

The devices 160, 162 may each include computing devices capable of receiving user input as well as transmitting and/or receiving data via a network 102. Devices 160, 162 may each be a device having computer functionality, such as a personal digital assistant (PDA), a mobile telephone, a smartphone, a tablet, a laptop computer, or another suitable device. Devices 160, 162 may each be configured to communicate via the network 102. The network 102 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 102 include multi-protocol label switching (MPLS), transmission control protocol/Internet protocol (TCP/IP), hypertext transport protocol (HTTP), simple mail transfer protocol (SMTP), and file transfer protocol (FTP). Data exchanged over the network 102 may be represented using any suitable format, such as hypertext markup language (HTML) or extensible markup language (XML). In some examples, all or some of the communication links of the network 102 may be encrypted using any suitable technique or techniques.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

The invention claimed is:

1. An online system, comprising:
a processor; and
a non-transitory computer-readable medium communicatively coupled to the processor and including instructions that, when executed by the processor, causes the processor to:
receive a request comprising an audience definition of an audience;
identify a set of users based on the audience definition;
identify one or more images interacted with by the set of users;
determine a first image concept conveyed in the one or more images;
generate an output based on the first image concept;
determine a first probability that the first image concept was at least a partial reason that the one or more images were interacted with by at least some members of the audience; and
provide the output responsive to the request.

2. The online system of claim 1, wherein the output is based on the first probability.

3. The online system of claim 2, wherein the processor is further caused to:
determine at least a second image concept, and wherein generating the output comprises:
determining a second probability that the second image concept was at least a partial reason that the one or more images were interacted with by at least some members of the audience; and providing a ranked listing of the first image concept and the second image concept based on the first probability and the second probability.

4. The online system of claim 1, wherein the processor is further caused to:

generate an image concept model that correlates attributes of users with image concepts determined from images interacted with by the set of users;

apply one or more user attributes in the audience definition to the image concept model; and obtain the image concept as an output of the image concept model.

5. The online system of claim 4, wherein the processor is further caused to:

receive a candidate image to be provided to the audience, the candidate image based on the image concept;

provide the candidate image to the audience;

determine a number of user interactions with the candidate image; and update the image concept model based on the number of user interactions.

6. The online system of claim 4, wherein the audience definition is received in association with a campaign, and wherein the processor is further caused to:

monitor a result of the campaign; and update the image concept model based on the result.

7. The online system of claim 1, wherein the processor is further caused to:

obtain a plurality of images interacted with by users; and for each of the plurality of images:

identify at least one image concept based on computer vision analysis; and store, in an image concept store, the at least one image concept in association with the image, wherein the determined image concept is based on the image concept store.

8. The online system of claim 7, wherein the processor is further caused to:

identify a first location of a first image concept in a first image;

identify a second location of a second image concept in the first image; and determine a location context based on the first location and the second location, wherein the generated output is based on the location context.

9. The online system of claim 1, wherein to generate the output, the processor is further caused to:

generate an image concept recommendation comprising an identification of the image concept to be included in an image provided to the audience.

10. The online system of claim 9, wherein the processor is further caused to:

identify a sample image that includes the image concept; and include the sample image with the image concept recommendation.

11. The online system of claim 1, wherein to generate the output, the processor is further caused to:

generate a candidate image based on the image concept.

12. The online system of claim 11, wherein to generate the candidate image, the processor is further caused to:

identify an audience based on the audience definition, the audience to receive the candidate image; and include the image concept in the candidate image based on a prediction that the image concept appeals to the audience.

13. The online system of claim 1, wherein to generate the output, the processor is further caused to:

receive a candidate image to be provided to the audience;

identify one or more image concepts from the candidate image; and determine an assessment that comprises a probability that the candidate image has a likelihood of being interacted with by the audience based on the one or more image concepts identified from the candidate image and the audience definition.

14. A method, comprising:

processing, by an online system, a plurality of images, wherein for each image, the processing comprises:

identifying one or more image concepts from the image based on computer vision analysis of the image;

storing, in an image store, the one or more image concepts in association with the image;

providing the image for interaction to a plurality of users of the online system;

determining a set of users, from among the plurality of users, that interacted with the image; and storing, in an action log, an indication of the interaction;

receiving, by the online system, a request comprising an audience definition;

identifying, by the online system, a set of users based on the audience definition;

identifying, by the online system, one or more images interacted with by the set of users based on the action log;

determining, by the online system, an image concept based on the plurality of images; and providing, by the online system, an output based on the image concept.

15. The method of claim 14, wherein generating the output comprises:

generating an image concept recommendation comprising an identification of the image concept to be included in an image provided to the audience.

16. The method of claim 15, further comprising:

identifying a sample image that includes the image concept; and including the sample image with the image concept recommendation.

17. The method of claim 14, wherein generating the output comprises:

generating a candidate image based on the image concept.

18. The method of claim 14, wherein generating the output comprises:

receiving a candidate image to be provided to the audience;

identifying one or more image concepts from the candidate image; and determining an assessment that comprises a probability that the candidate image has a likelihood of being interacted with by the audience based on the one or more image concepts identified from the candidate image and the audience definition.

19. An online system, comprising:

a processor; and a non-transitory computer-readable medium communicatively coupled to the processor and including instructions that, when executed by the processor, causes the processor to:

identify interactions with a plurality images by a user, wherein a plurality of attributes is known about the user;

identify a plurality of image concepts from the plurality of images;

determine a correlation between an attribute of the user with one or more of the plurality of image concepts; and generate an image concept model based on the determined correlation.

20. The online system of claim 19, wherein the processor is further caused to:

generate, via the image concept model, a recommendation to use an image concept in a candidate image;

monitor user interactions with the candidate image; and update the image concept model based on the monitored user interactions.

* * * * *